(12) United States Patent
Morrison et al.

(10) Patent No.: US 7,284,279 B2
(45) Date of Patent: Oct. 16, 2007

(54) SYSTEM AND METHOD FOR PREVENTING UNAUTHORIZED OPERATION OF IDENTIFICATION AND FINANCIAL DOCUMENT PRODUCTION EQUIPMENT

(75) Inventors: Michael A. Morrison, Eagan, MN (US); James A. Jordan, Eagan, MN (US); Jon E. Freise, Minneapolis, MN (US)

(73) Assignee: DataCard Corporation, Minneapolis, MN (US)

( * ) Notice: Subject to any disclaimer, the term of this patent is extended or adjusted under 35 U.S.C. 154(b) by 670 days.

(21) Appl. No.: 10/384,161

(22) Filed: Mar. 7, 2003

(65) Prior Publication Data

US 2003/0182587 A1 Sep. 25, 2003

Related U.S. Application Data

(60) Provisional application No. 60/364,685, filed on Mar. 15, 2002.

(51) Int. Cl.
    *H04L 9/32* (2006.01)
    *G06F 21/00* (2006.01)
(52) U.S. Cl. .................. 726/34; 726/17; 713/184; 713/186; 340/5.8
(58) Field of Classification Search .................. 726/26, 726/34, 35; 713/182; 380/55; 705/64, 72
    See application file for complete search history.

(56) References Cited

U.S. PATENT DOCUMENTS

| | | | | |
|---|---|---|---|---|
| 5,633,932 A | | 5/1997 | Davis et al. | |
| 5,812,764 A | * | 9/1998 | Heinz, Sr. ........................ | 726/5 |
| 5,960,084 A | * | 9/1999 | Angelo ........................ | 713/185 |
| 5,970,227 A | * | 10/1999 | Dayan et al. .................. | 726/34 |
| 5,970,228 A | * | 10/1999 | Nezu ........................... | 726/34 |
| 6,166,688 A | * | 12/2000 | Cromer et al. ......... | 342/357.17 |
| 6,272,541 B1 | * | 8/2001 | Cromer et al. ............ | 709/224 |
| 6,275,851 B1 | * | 8/2001 | Cromer et al. ............ | 709/217 |
| 6,286,102 B1 | * | 9/2001 | Cromer et al. ............ | 726/35 |
| 6,362,893 B1 | | 3/2002 | Francis et al. | |
| 6,418,533 B2 | * | 7/2002 | Angelo et al. ............ | 726/19 |
| 6,647,497 B1 | * | 11/2003 | Cromer et al. ............ | 726/16 |

(Continued)

FOREIGN PATENT DOCUMENTS

EP 0 657 845 A2 6/1995

(Continued)

*Primary Examiner*—Christopher Revak
(74) *Attorney, Agent, or Firm*—Hamre, Schumann, Mueller & Larson, P.C.

(57) ABSTRACT

Improvements in security relating to the use of personalized document production equipment. The invention has particular use with respect to printers that are used to produce plastic cards, such as financial cards and identification cards. The invention prevents the unauthorized production of personalized documents through the use of stolen or fraudulently obtained production equipment or software. The equipment is locked until a user enters authorization data that matches authorization data stored in memory of the equipment. The equipment is able to power-up in the locked state, at which point the user is prompted to enter the authorization data. As a result, if the equipment is stolen, the thief is unable to operate the equipment without the necessary authorization data.

11 Claims, 3 Drawing Sheets

U.S. PATENT DOCUMENTS

| | | |
|---|---|---|
| 6,829,712 B1 * | 12/2004 | Madoukh .................... 726/2 |
| 7,003,667 B1 * | 2/2006 | Slick et al. ................. 713/182 |
| 2002/0083114 A1 * | 6/2002 | Mazzagatte et al. ........ 709/100 |
| 2003/0044009 A1 * | 3/2003 | Dathathraya ................ 380/55 |
| 2003/0145218 A1 * | 7/2003 | Hutchison .................. 713/200 |

FOREIGN PATENT DOCUMENTS

| | | |
|---|---|---|
| EP | 1 083 516 A2 | 3/2001 |
| EP | 1 091 275 A2 | 4/2001 |
| WO | WO99/49379 | 9/1999 |

* cited by examiner

SYSTEM AND METHOD FOR PREVENTING UNAUTHORIZED OPERATION OF IDENTIFICATION AND FINANCIAL DOCUMENT PRODUCTION EQUIPMENT

This application claims priority from provisional application Ser. No. 60/364,685, filed Mar. 15, 2002, and which is incorporated herein by reference.

FIELD OF THE INVENTION

This invention relates to equipment, such as printers, that are used to produce data bearing identification and financial documents, including plastic cards such as financial (e.g. credit and debit) cards, drivers' licenses, national identification cards, and other similar cards, as well other identification and financial documents, such as passports, by personalizing the documents with information unique to the document holder and/or with other document information. More particularly, the invention relates to improvements in security involving the use of such equipment to prevent the unauthorized use of the equipment, thereby preventing the unauthorized production of documents.

BACKGROUND OF THE INVENTION

Production and issuance of identification and financial documents, such as financial (e.g. credit and debit) cards, drivers' licenses, national identification cards, and other like cards, as well as passports and the like, must be done in a highly secure manner in order to ensure the integrity and distribution of the issued documents. The security concerns surrounding the issuance of these types of documents includes the prevention of document forgeries and duplications, issuance of a document to a person other than for whom the document was created, and issuance to unauthorized persons such as criminals.

These types of documents are typically produced and issued by local or federal governmental authorities, by business entities that are in the business of producing such documents, and by institutional and other entities that have need for such documents and that have purchased the necessary equipment to produce such documents. Regardless of who produces the documents, there is a need to guard against fraudulently produced documents.

One way to control the production of unauthorized and fraudulent identification and financial documents is by controlling access to the document production equipment and software necessary to operate the equipment. However, when the document production equipment and/or software is stolen, or when one fraudulently obtains access to the production equipment, unauthorized documents may be able to be produced.

However, improvements in controlling the production of unauthorized identification and financial documents are still needed.

SUMMARY OF THE INVENTION

The invention relates to improvements in security relating to the use of identification and/or financial document production equipment. The invention has particular use with respect to printers that are used to produce plastic cards, such as financial cards and identification cards. However, the invention can also be used with other types of identification and financial document production equipment in which it is necessary to prevent unauthorized production of such documents.

In particular, the invention prevents the unauthorized production of identification and financial documents through the use of stolen or fraudulently obtained document production equipment or software. In a preferred embodiment, the equipment is locked (unable to perform its intended personalization function(s)) until a user enters authorization data, for example a password, that matches authorization data, for example a password, stored in memory of the equipment. However, the equipment is able to power-up in the locked state, at which point the user is prompted to enter the authorization data. As a result, if the equipment is stolen, the thief is unable to operate the equipment without the necessary authorization data.

In one aspect of the invention, the authorization data that is stored in memory is initially entered into the equipment at the factory that produces the equipment, by the manufacturer of the equipment, or by an authorized agent of the manufacturer. The authorization data can be a password that is generated from a random generation process, for example a random number generation process. Alternatively, the password can be based on information that is unique to the specific piece of equipment, and can include the serial number of the piece of equipment, the date of its manufacture, and combinations of these and other specific information. Alternatively, the authorization data can be biometric data from an authorized user(s) of the equipment. One or more of these authorization data types can be used together.

To further enhance security, the piece of equipment with the authorization data stored in memory is delivered from the factory or manufacturer to the intended equipment user, while information concerning the authorization data, for example the stored password itself or the identity of an individual(s) whose biometric data is stored in memory, is delivered by a secure process, such as certified letter, to an authorized agent of the equipment user. Upon initial and subsequent power-ups of the equipment, the authorized agent, and those provided with the authorization data by the agent, can then unlock the equipment for use by entering the proper authorization data. Preferably, the user is prompted for entry of the authorization data each time the equipment is shut-down or disconnected from its power supply.

In another aspect of the invention, the equipment is disabled after a predetermined number of failed attempts to enter the proper authorization data. To then enable the equipment for operation, it would be necessary to return the printer to an authorized service location, or conduct an on-site service call utilizing a secured communication between the customer's authorized agent and the manufacturer.

In another aspect of the invention, the authorization data stored in equipment memory can be changed, preferably at the discretion of the authorized agent of the equipment user. This would allow for disciplined and/or periodic changes to the authorization data by the equipment user to prevent former employees and associates from operating the equipment.

In one specific embodiment, a method of preventing unauthorized operation of personalized document production equipment is provided. The equipment has a locked state in which the equipment cannot produce documents and an unlocked state in which the equipment is able to produce documents. In the method, at a location separate from the intended use location of the equipment, authorization data is stored in memory of the equipment. At the use location and while the equipment is in a locked state, entry of the authorization data is prompted. After the authorization data has been entered, the stored authorization data is compared to the entered authorization data, and if the stored authorization data matches the entered authorization data, the equipment is unlocked to allow production of documents.

In another specific embodiment, a method of preventing unauthorized operation of personalized document production equipment comprises: at a first location, storing authorization data that is necessary to enable equipment operation in memory of the equipment; delivering the equipment from the first location to an equipment user at a second location; and delivering information concerning the authorization data to an authorized agent of the equipment user at the second location. Upon entry of the authorization data into the equipment and comparison of the entered authorization data with the stored authorization data, operation of the equipment is enabled if the entered authorization data matches the stored authorization data.

In still another specific embodiment, a method of preventing unauthorized operation of personalized document production equipment is provided. The equipment has a locked state in which the equipment cannot produce documents and an unlocked state in which the equipment is able to produce documents. In the method, a password that is produced through a random generating process is stored in memory of the equipment. While the equipment is in a locked state, entry of the password is prompted. After the password has been entered, the stored password is compared to the entered password, and if the stored password matches the entered password, the equipment is unlocked to allow production of personalized documents.

For a better understanding of the invention, its advantages and objects obtained by its use, reference should be made to the drawings which form a further part hereof, and to the accompanying description, in which there is described a preferred embodiment of the invention.

DETAILED DESCRIPTION OF THE INVENTION

The invention relates to improvements in security relating to the use of data bearing identification and/or financial document production equipment. The invention has particular use with respect to printers that are used to produce plastic cards, such as financial (e.g. debit and credit) cards, driver's licenses, and identification cards. However, the invention can also be used with other types of identification and/or financial document production equipment, including passport production equipment, in which it is necessary to prevent unauthorized production of documents.

For sake of convenience, the types of documents to which the invention applies can be referred to as "personalized documents". It is to be understood that "personalized documents" and the like, when used in the description and claims, refers to data bearing identification or financial documents, including those specific document types disclosed herein.

The invention prevents the operation of stolen or fraudulently obtained document production equipment, by requiring the proper authorization data in order to unlock the equipment prior to use. Without the proper authorization data, the equipment remains locked, thereby preventing the production of a personalized document.

As used herein, the terms "personalize", "personalization", etc. include one or more of printing (monochromatic and multi-color) characters and/or images on a document, embossing a document with embossed characters, programming a magnetic stripe on the document, programming an integrated circuit chip embedded in the document, laminating onto the document a lamina material that contains printed data, applying information to the document using a laser, and combinations thereof. The various mechanisms for performing these personalization functions are well known in the art.

The preferred embodiment of the invention will be described in relation to a printer that is used to produce a plastic identification and/or financial card by printing cardholder information onto the card. However, the inventive concepts described herein can also be used on other personalized document production equipment.

Figure 1:
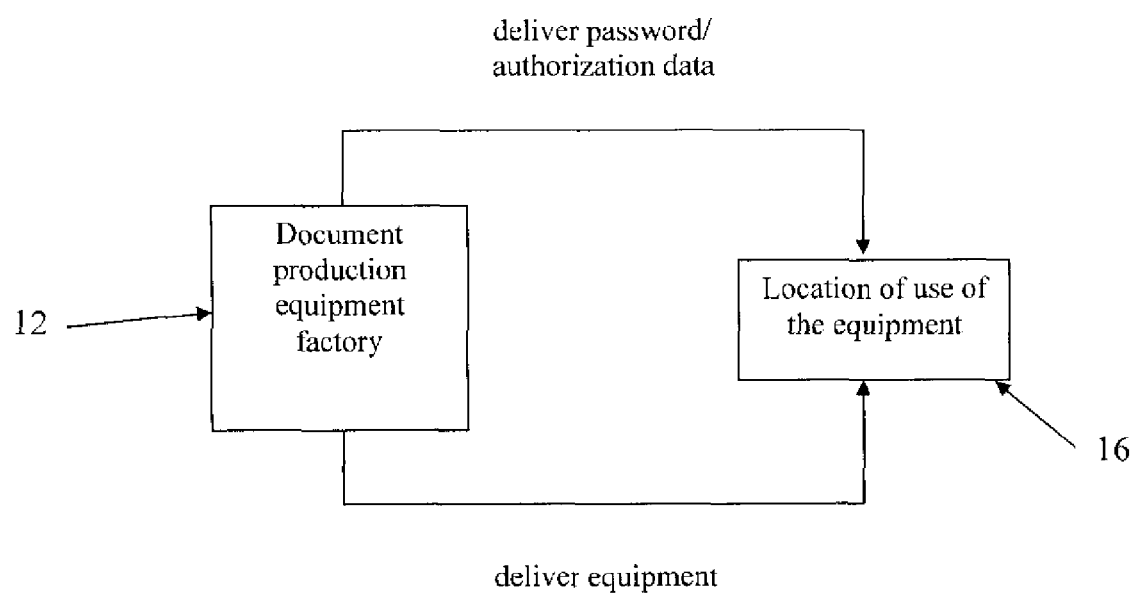
FIG. 1 is a schematic illustration of the present invention.
Figure 3:
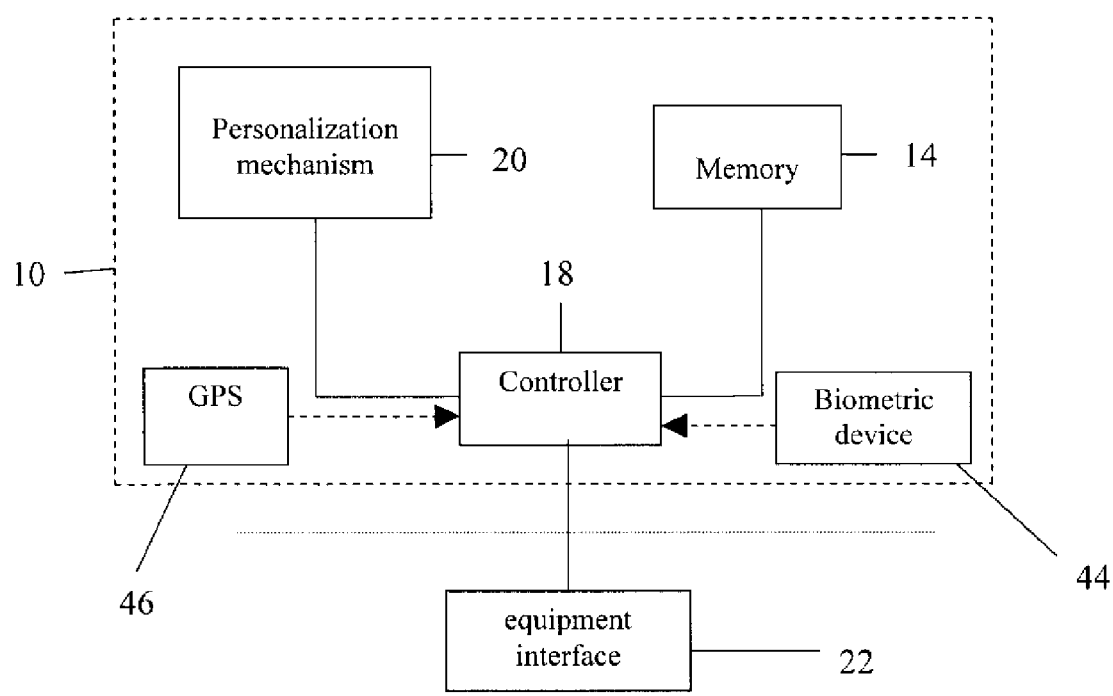
FIG. 3 illustrates the document production equipment of the present invention.

With reference to FIGS. 1 and 3, the printer 10 is produced at a factory 12. During production, or after production is completed but prior to delivery to the intended equipment user, authorization data is loaded into memory 14 of the printer 10. The authorization data can be a password or other authorization data (such as biometric data described later). When a customer orders the printer 10, the printer 10 is delivered to the customer, which may be the intended location of use 16 of the printer. Separately, information concerning the authorization data that is necessary to operate the printer 10 is delivered to an authorized agent of record for the customer, such as a security officer or other individual designated by the customer. Delivery of the authorization data information is preferably by mail, and more preferably by certified letter. However, other secure delivery methods could be used, such as by encrypted data communications over secure land lines or by wireless means.

The authorization data information that is delivered can be the password that is stored in the printer memory, if the stored authorization data is a password. Alternatively, if the stored authorization data is biometric data, the authorization data information that is delivered can be the name of the person (or people) whose biometric data is stored in memory.

In the preferred embodiment, the authorization data is a password. The password is preferably a random password that is generated by a random generation process known in the art. The random password is preferably composed of alphanumeric characters.

Alternatively, the password can be generated by an algorithm based upon information that is specific (i.e. unique) and traceable to the printer 10. For example, the serial number of the printer, the date of manufacture of the printer, and other information specific to the printer, can be used, either singly or in combination, to produce the printer password. It is to be realized that the password could be based upon information other than printer specific information if desired.

The password is preferably composed of alphanumeric characters, with no spaces between characters, no punctuation and no control characters. The number of characters is preferably twenty or less. Other password characters, as well as a smaller or larger number of password characters, could also be used.

As an alternative to using a password, or in addition to the password to further increase security, it is contemplated that the printer 10 can be equipped with other security features. For example, the printer 10 can be integrally provided with, or interfaced with, a biometric interface device 44, such as a fingerprint sensor or an iris scanner. The biometric interface device would receive biometric authorization data, such as an operator's fingerprint, and send the biometric data to the controller 18 for comparison with authorized biometric data stored in memory. Printer operation would be prevented unless the biometric data matches the stored biometric data. The biometric data in memory is preferably limited to certain individuals, for example a security officer or other authorized agent of the equipment user. In another alternate embodiment, the printer can be integrally provided with, or interfaced with, Global Positioning System (GPS) technology 46. If the printer is moved out of a designated area, as determined by the GPS technology, thereby indicating a possible theft of the printer, the printer can be disabled.

Upon initial power-up of the printer 10 by the customer, the printer 10, through the printer controller 18 (FIG. 3), will demand entry of the authorization data before any operations of the printer's 10 personalization mechanism 20 will commence. In the preferred embodiment, the personalization mechanism 20 is at least one printer mechanism that performs monochromatic or multi-color printing. The same authorization data demand is made during subsequent power-ups of the printer 10. The authorization data demand is made via a authorization data prompt that is displayed on a printer interface 22, such as a PC or a status monitor separate from the printer 10. The printer interface 22 could also be built into the printer itself, such as an LCD or similar display.

The printer 10 is designed to power-up in a locked state in which operations of the personalization mechanism 20 are prevented until the proper authorization data is entered. Thus, without the proper authorization data, the printer 10 will not operate, and cards will not be produced. Further, any disconnection or shut-off of power from the printer 10 will return the printer to the locked state, and require entry of the correct authorization data to unlock the printer 10 to allow operation of the personalization mechanism 20 of the printer 10. If a print job is sent to the printer before it is unlocked, a "printer locked" will be displayed by the interface 22.

When the authorization data is a password, entry of the password is achieved via the interface 22 or other input mechanism, which sends the entered password to the printer controller 18 for comparison with the password stored in memory 14. If the entered password matches the stored password, the printer is unlocked and the personalization mechanism 20 is able to operate. The printer 10 remains unlocked until it is power cycled or relocked by command. If the entered password does not match the stored password, the printer will send an "incorrect password" error and the printer will remain locked. In a preferred embodiment, after a predetermined number of failed attempts to enter the correct password, the printer 10 is disabled. Thereafter, to enable printer operation, it would be necessary to return the printer to an authorized service location, or conduct an on-site service call utilizing a secured communication between the customer's authorized agent and the manufacturer.

In a preferred embodiment, upon successful entry of the initial printer password, the customer, preferably the authorized agent of the customer, is able to change the password that is stored in printer memory 14. The password change is preferably achieved using the printer interface 22. This will allow for disciplined and periodic changes to the printer password in order to prevent operation of the printer 10 by former employees and associates.

Figure 2:
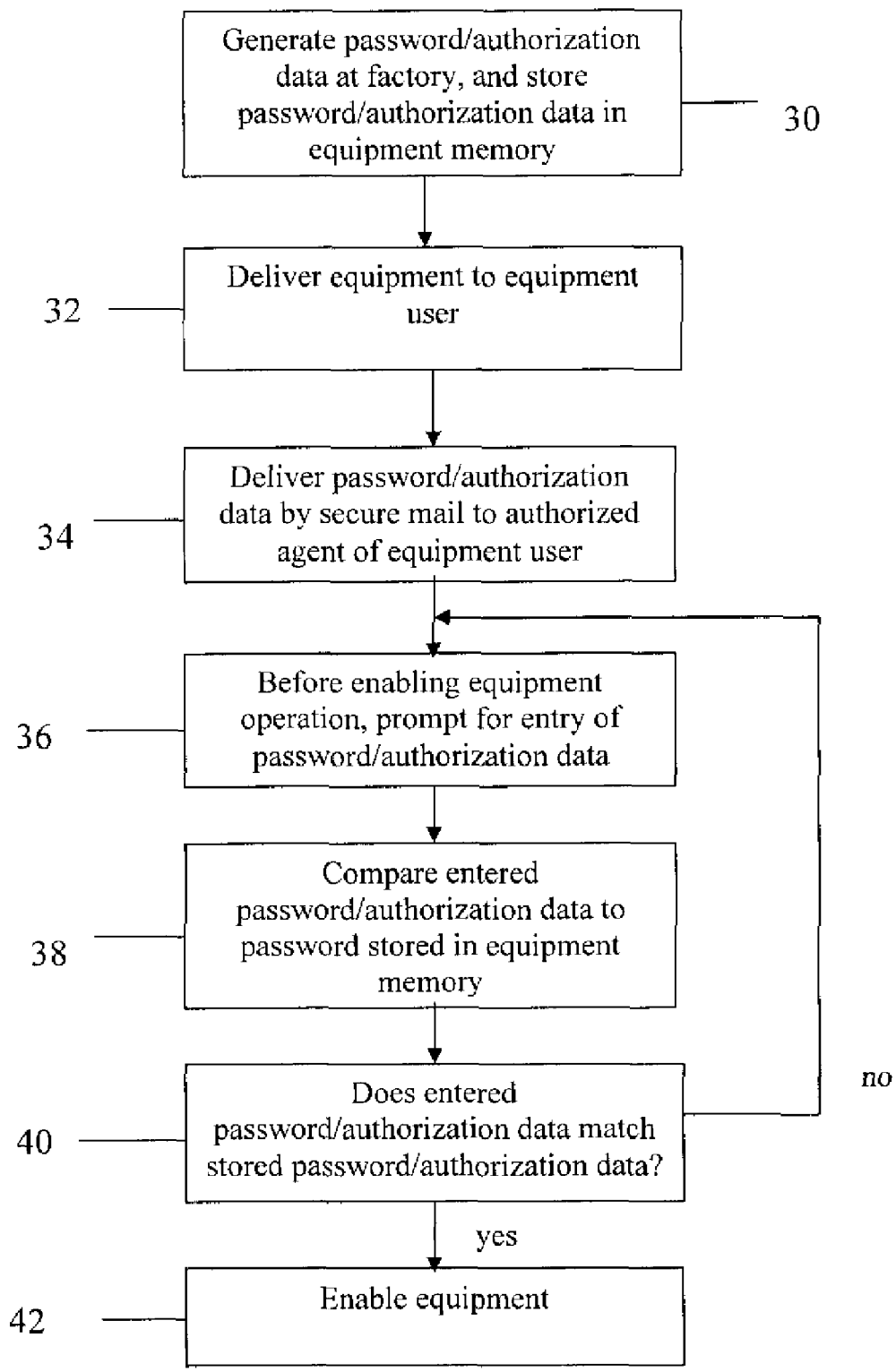
FIG. 2 illustrates the method of the present invention.

Turning now to FIG. 2, the method of the present invention will be described. The method will be described with respect to the use of a password as the authorization data. However, it is to be realized that a similar method would apply if the authorization data comprised biometric data, or a combination of a password and biometric data.

Initially, at step 30, the password is generated at the factory 12 or at any other suitable location prior to delivery to the intended equipment user, and the password is stored in printer memory. The printer 10 is then delivered to the customer at step 32. At step 34, the password is then delivered by a secure mechanism, such as certified letter, to an authorized agent of the customer. The printer 10 is then powered-up in a locked state, and, at step 36, the user is prompted for the password. The user then enters the password using the interface 22, and the entered password is sent to the printer controller 18. The entered password is then compared, at step 38, to the password stored in memory. If the entered password matches the stored password at step 40, the printer is unlocked or enabled and the personalization mechanism 20 can begin operations. If the entered password does not match the stored password at step 40, the printer remains locked, and the user is once again prompted for entry of the password. After a predetermined number of incorrect matches between the entered password and the stored password, the printer is disabled and the methods discussed above (i.e. return printer to service location or on-site service call) must be followed to re-enable the printer.

The above specification, examples and date provide a complete description of the invention. Many embodiments of the invention, not explicitly described herein, can be made without departing from the spirit and scope of the invention.

What is claimed is:

1. A method of preventing unauthorized operation of personalized document production equipment, comprising:
    at a first location and prior to operation of the personalized document production equipment by an equipment user, storing authorization data that is necessary to enable equipment operation in memory of the equipment, the authorization data is required upon initial and subsequent power-ups of the equipment to enable operation of the equipment;
    delivering the equipment from the first location to the equipment user at a second location;
    delivering information concerning the authorization data to an authorized agent of the equipment user at the second location;
    entering the authorization data into the equipment and comparing the entered authorization data with the stored authorization data, and
    unlocking the personalized document production equipment solely until the equipment is power cycled or relocked by command, so as to enable operation of the personalized document production equipment when the entered authorization data matches the stored authorization data.

2. The method according to claim 1, wherein the first location is the place of manufacture of the equipment.

3. The method according to claim 1, wherein the equipment comprises a printer.

4. The method according to claim 1, further comprising delivering the authorization data information by mail.

5. The method according to claim 4, comprising delivering the authorization data information by certified letter.

6. The method according to claim 1, further comprising prompting entry of the authorization data each time the equipment is powered-up.

7. The method according to claim 1, further comprising preventing equipment operation upon a predetermined number of mismatches between the entered authorization data and the stored authorization data.

8. The method according to claim 1, further comprising changing the stored authorization data.

9. The method according to claim 1, wherein the stored authorization data is a password that is produced through a random generation process.

10. The method according to claim 1, wherein the stored authorization data is biometric data from an authorized user of the equipment.

11. The method according to claim 1, further comprising, after initial operation of the document production equipment, determining whether the document production equipment has physically moved out of a designated area, and if it is determined that the document production equipment has moved out of the designated area, disabling the document production equipment.

* * * * *